United States Patent

Rydel

[11] Patent Number: 5,305,459
[45] Date of Patent: Apr. 19, 1994

[54] CIRCUIT FOR "WAKING UP" A MICROPROCESSOR POWER SUPPLY, IN PARTICULAR FOR AN ID CARD IN A CAR REMOTE CONTROL SYSTEM

[75] Inventor: Charles Rydel, Paris, France

[73] Assignee: Valeo Securite Habitacle, Croissy-sur-Seine, France

[21] Appl. No.: 49,632

[22] Filed: Apr. 19, 1993

Related U.S. Application Data

[63] Continuation of Ser. No. 681,554, Apr. 5, 1991.

[30] Foreign Application Priority Data

Apr. 6, 1990 [FR] France .................. 90 04427

[51] Int. Cl.$^5$ ................................ G06F 1/32
[52] U.S. Cl. .................. 395/750; 340/825.69; 371/29.1; 371/29.5
[58] Field of Search .......... 395/750; 371/29.5, 29.1; 340/457, 524, 825.69; 368/256

[56] References Cited

U.S. PATENT DOCUMENTS

| | | | |
|---|---|---|---|
| 4,429,299 | 1/1984 | Kabat et al. | 340/825.26 |
| 4,625,274 | 11/1986 | Schroeder | 364/200 |
| 4,677,308 | 6/1987 | Wroblewski et al. | 307/10 |
| 4,698,748 | 10/1987 | Juzswik et al. | 364/200 |
| 4,835,531 | 5/1989 | Sato | 340/825.31 |
| 4,835,533 | 5/1989 | Akutsu | 340/825.31 |
| 4,839,530 | 6/1989 | Greenwood | 307/10 |
| 4,849,919 | 6/1989 | Haneda | 364/200 |
| 4,894,813 | 1/1990 | Pächer et al. | 368/256 |
| 4,942,393 | 7/1990 | Waraksa et al. | 340/825.31 |
| 4,959,810 | 9/1990 | Darbee et al. | 364/900 |
| 4,965,550 | 10/1990 | Wroblewski | 340/524 |
| 5,038,135 | 8/1991 | Jurkiewicz et al. | 340/457 |
| 5,081,586 | 1/1992 | Barthel et al. | 395/750 |
| 5,115,236 | 5/1992 | Köhler | 340/825.69 |

Primary Examiner—Michael R. Fleming
Assistant Examiner—Tariq R. Hafiz

[57] ABSTRACT

The circuit comprises:

converter means receiving an input train of control pulses and increasing the level of a control signal by a given increment each time it detects a new received pulse, the level of said control signal then decreasing progressively until the following pulse is detected; and threshold means suitable for producing said wake-up signal when the level of said control signal has reached a predetermined threshold value in such a manner as to produce said wake-up signal only when the number of control pulses applied to the input has reached a predetermined minimum number and providing the recurrence frequency of the pulses is not less than a predetermined limit frequency.

7 Claims, 1 Drawing Sheet

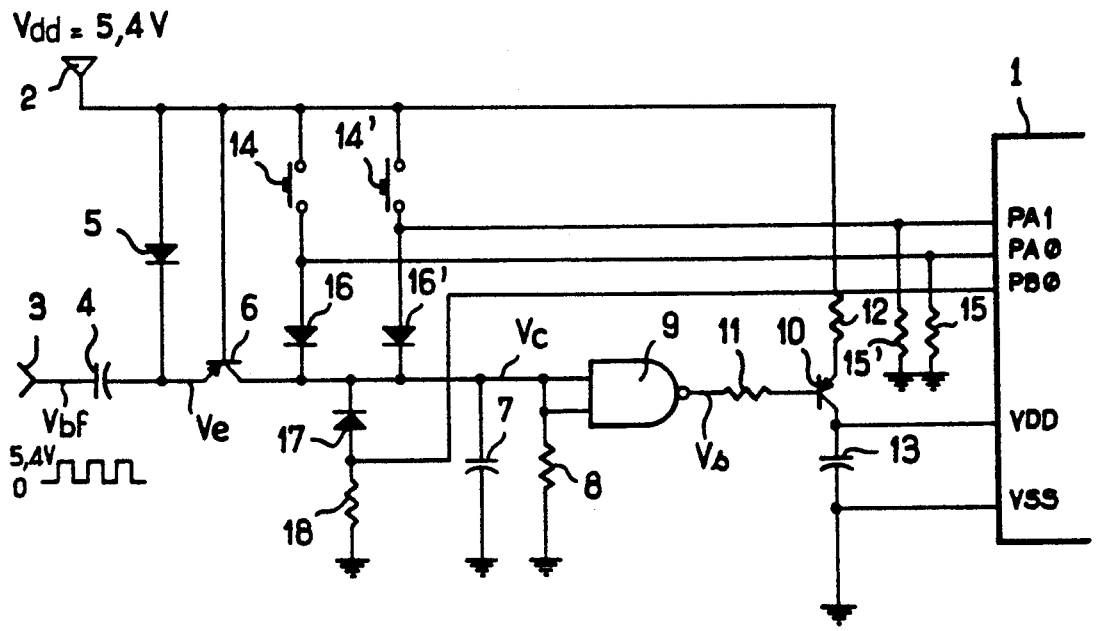
FIG_1
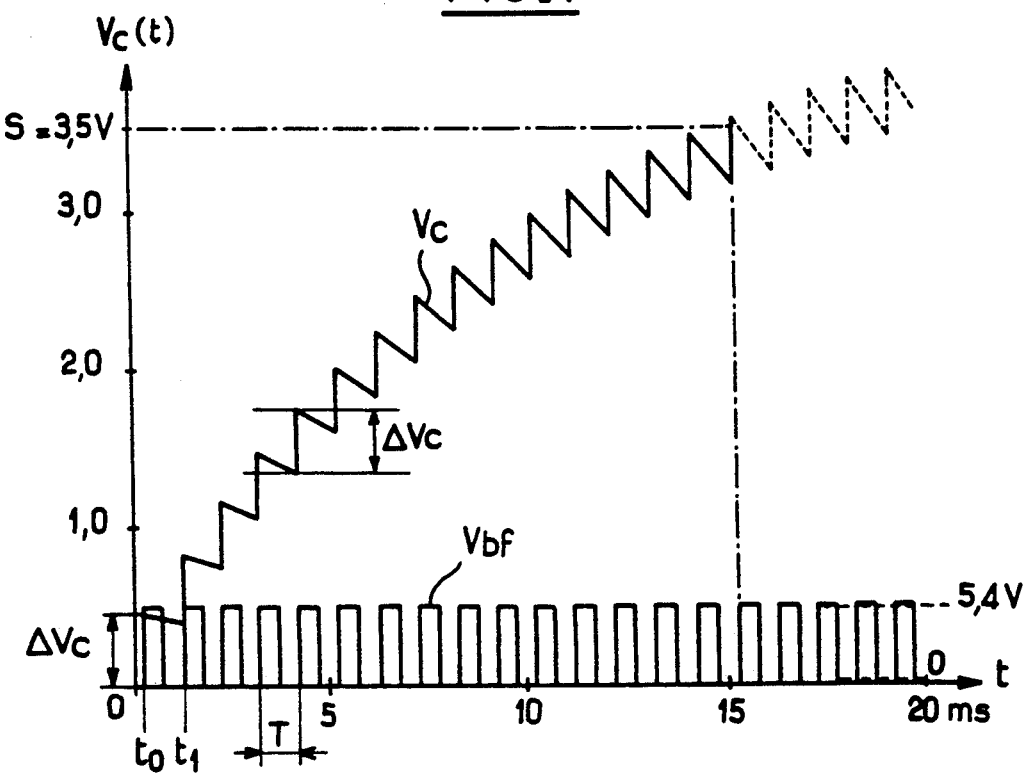
FIG_2

CIRCUIT FOR "WAKING UP" A MICROPROCESSOR POWER SUPPLY, IN PARTICULAR FOR AN ID CARD IN A CAR REMOTE CONTROL SYSTEM

This is a continuation of co-pending application Ser. No. 07/681,554, filed on Apr. 5, 1991.

The present invention relates to a circuit for "waking up" a microprocessor power supply, in particular for use in interactive remote control systems for cars.

BACKGROUND OF THE INVENTION

In such systems, which are to enable a driver approaching a vehicle to be recognized remotely, an on-board module integrated in the car sends out an interrogation signal to an "electronic label" which is generally implemented in the form of a badge or a flat card worn or carried by the driver, e.g. in a pocket. The card receives the interrogation signal, analyzes it by means of a microprocessor which is incorporated in the card, and generates an encoded identification (ID) signal specific to the card, which signal is transmitted back from the card to the on-board module which then performs various actions, e.g. unlocking the doors, and automatically adjusting the positions of the rearward mirrors, the steering wheel, etc.

One of the main difficulties encountered with this type of remote control lies in the fact that the card carried by the driver must be small in size (typically credit card sized) while nevertheless remaining operational for a long period of time (about one year), and as a result the energy consumption of the circuits it contains is a major constraint governing its design.

In addition, since identification must be capable of taking place "on the fly", i.e. without contact between the on-board module and the card and without even requiring the driver to take the card out of a pocket and press a button on the card, it is necessary for the card to be ready at an instant to receive and analyze an incident interrogation signal without any prior external action being taken by the driver (e.g. pressing a button on the card).

Further, given that the microprocessor consumes energy at a relatively high rate, it cannot be left switched on permanently in its normal active state. Use is thus made of the possibility of switching the microprocessor back and forth between an "awake" state in which it is active and a "sleep" state in which its consumption is tiny or zero. The microprocessor is switched from the sleep state to the awake state by applying a wake-up signal to an input of the microprocessor specially designed for this purpose, or else merely by applying the signal to the power supply terminal of the microprocessor (in which case the wake-up signal is constituted by the power supply direct voltage).

It can thus be seen that only a receiver circuit needs to be powered permanently (which receiver circuit transforms the received radiofrequency signal into a demodulated and amplified low frequency signal), together with an interface circuit disposed between the receiver and the microprocessor and capable of verifying that the demodulated signal satisfies a certain number of criteria, and if it does, then applying the wake-up signal to the microprocessor in order to switch it to its active state.

The present invention relates specifically to such a circuit (referred to below as a "power supply wake-up circuit") providing the interface between the circuit for receiving remote controlled signals transmitted by the on-board vehicle and the microprocessor in the ID card.

It should nevertheless be observed that the application to remote control of cards is not limiting and that other comparable applications could be envisaged without going beyond the scope of the present invention.

Similarly, the power supply wake-up circuit of the invention is perfectly capable of processing signals other than those produced by a radio signal receiver, and the present invention is thus equally applicable to waking up the power supply of a microprocessor from input signals that satisfy comparable conditions but that are produced by circuits other than a radio receiver.

Also, the term "microprocessor" should not be understood in its narrow technological meaning, but in a wide sense covering any circuit capable of performing digital processing, and thus extending equally well to circuits having a high degree of integration (such as microcontrollers) and to circuits having a lower degree of integration (circuits that need to be associated with discrete components). In any event, the function performed by the circuit of the invention is completely independent of the technology and the structure of the circuits to which it is connected, both upstream and downstream.

The present invention thus provides a power supply wake-up circuit capable of discriminating an effective interrogation signal produced by the on-board module of a vehicle from other signals that may be picked up by the radio receiver, and most particularly mains frequency interference (e.g. 100 Hz) that could, under certain reception conditions and unless special precautions are taken, be misinterpreted as a control pulse train of an interrogation signal.

More precisely, in order to perform such discrimination, provision is made for the interrogation signal message (i.e. a digital message encoded in the form of pulses) to begin with a header constituted by a succession of similar pulses (referred to below as "control pulses"), with there being a predetermined number of these pulses and with these pulses having a predetermined recurrence frequency.

After discrimination, this message header is intended to wake up the microprocessor so that once it has switched to its active state it can process the following pulses of the coded message per se contained in the interrogation signal.

Firstly, in order to discriminate sporadic interference, a first condition is provided requiring the control pulse train to be constituted by a minimum number of successive pulses, e.g. not less than sixteen control pulses.

Secondly, in particular to avoid the microprocessor being woken up uselessly by mains frequency interference, a second condition is provided requiring the recurrence frequency of the control pulses to be not less than a predetermined limit frequency that is considerably higher than mains interference frequency (e.g. 100 Hz); it would thus be possible to provide a typical recurrence frequency of 1 kHz, corresponding to control pulses having a recurrence period T=1 ms.

In contrast, it is not desirable to lay down conditions on the duration of each pulse (i.e. on the duty ratio of the control pulse train) since this parameter may suffer from relatively large dispersion from one on-board module to another and drift may also occur as a function of temperature variations and of component aging.

That is why only the above-mentioned two conditions are taken into account simultaneously, i.e. a minimum number of control pulses and a minimum frequency for the control pulses.

Further, given the above-mentioned energy consumption constraints and the fact that the wake-up circuit must be capable of being operational at any moment, the energy consumption of the wake-up circuit itself must be as low as possible so as to have no harmful effect on the lifetime of the battery powering the ID card.

EP-A-0 343 619 describes a microprocessor wake-up circuit situated on-board a vehicle for responding to signals coming from a bade or the like that is suitable only for transmission. This wake-up circuit is subjected to much less severe constraints on its electrical power supply because of the presence of the vehicle's own battery, and it is also complex and unsuitable for integration in a small-sized portable badge.

U.S. Pat. No. 3,150,271 describes a transistor "pumping" circuit, however this document neither mentions nor suggests in any way that such a circuit should be used in co-operation with threshold means and with a radio receiver circuit, nor does it make any mention of an application to waking up a microprocessor in a portable badge.

SUMMARY OF THE INVENTION

The present invention provides a microprocessor power supply wake-up circuit satisfying all of the requirements mentioned above.

This circuit is of the type mentioned above, i.e. a power supply wake-up circuit for switching a microprocessor from a non-powered state to a powered state by applying a wake-up signal to one of its inputs, in particular for use in an ID card for a car remote control system.

According to the invention, this circuit comprises:

converter means receiving an input train of control pulses and increasing the level of a control signal by a given increment each time it detects a new received pulse, the level of said control signal then decreasing progressively until the following pulse is detected; and threshold means suitable for producing said wake-up signal when the level of said control signal has reached a predetermined threshold value in such a manner as to produce said wake-up signal only when the number of control pulses applied to the input has reached a predetermined minimum number and providing the recurrence frequency of the pulses is not less than a predetermined limit frequency.

The said control signal may, in particular, be a voltage. Advantageously, it is independent of the duration and the level of the corresponding control pulse, and said given increment is a constant increment.

In one embodiment, said converter means comprise: a capacitor across whose terminals the voltage constituting the control signal is taken; a transistor switching between an off state and a saturated state so as to control charging of said capacitor; transistor control means for controlling said transistor and comprising a diode and capacitor circuit suitable for detecting a transition of a pulse applied to the input and for then causing the transistor to switch from the off state to the saturated state for a predetermined time interval in such a manner as to increase the charge accumulated on the capacitor by a given charge increment during said time interval; and a discharge resistor connected across the terminals of the capacitor so as to cause the charge accumulated thereon to decrease from the end of said predetermined time interval until the following pulse appears.

The circuit may also include wake-up forcing means suitable for applying a voltage directly to the terminals of the capacitor and its discharge resistor, which voltage is greater than the predetermined threshold value of the threshold means.

In particular, the pulse train may be the demodulated signal produced at the output of a radio remote control signal receiver.

BRIEF DESCRIPTION OF THE DRAWING

An embodiment of the invention is described by way of example with reference to the accompanying drawing, in which:

FIG. 1 is a circuit diagram of the circuit of the invention; and

FIG. 2 is a graph showing how the control signal Vc produced by the FIG. 1 circuit varies as a function of time on receiving a control pulse train Vbf.

DETAILED DESCRIPTION

In FIG. 1, reference 1 designates a microprocessor which is capable of taking up two operating states, namely a sleep state and an awake state, with switching from the sleep state to the awake state being performed by applying a positive power supply voltage Vdd (e.g. Vdd = 5.4 V) produced by a power supply source 2 on the corresponding input of the microprocessor (referenced VDD), with microprocessor terminal VSS being permanently connected to ground potential.

With the particular microprocessor considered in this case, which is a 68HC05 type microcontroller, for example, waking up is obtained merely by applying the power supply voltage to the power supply terminal of the microprocessor and by maintaining said voltage on said terminal. However, the circuit of the invention could be adapted to other types of microprocessor or digital circuit in which waking up is obtained by applying a pulse to a specific input that is independent from the power supply terminal.

The control pulses are applied to an input 3 of the circuit of the invention. In the example describe herein, these pulses are constituted by a demodulated rectangular signal alternating between 0 V and 5.4 V with a period T designated Vdf and shown at the bottom of FIG. 2 (with the Y-axis scale with respect to the signal Vbf being arbitrary in order to avoid overcrowding the drawing).

The control pulse train is applied to a first circuit constituting a frequency to voltage converter and comprising components referenced 4 to 8.

Firstly the control pulse train is applied to a first plate of a capacitor 4 whose second plate is connected to the cathode of a diode 5 whose anode is connected to the constant potential source 2. The connection between the capacitor 4 and the diode 5 is connected to the emitter of a common base connected transistor 6, i.e. a transistor having its base connected to the source 2, and a control signal Vc which varies over time in the manner shown in FIG. 2 is obtained at the collector of said transistor. Finally, the converter circuit includes a parallel-connected capacitor 7 and resistor 8 disposed between the collector of the transistor 6 and ground.

The signal Vc which is the output signal from the frequency-to-voltage converter is then applied to a logic inverter circuit acting as a threshold circuit 9, e.g. a two-input NAND gate or NOR gate having both inputs connected together, thus producing an output signal Vs in the event of the threshold being exceeded, which signal is applied to the base of a common collector connected second transistor 10 via a series resistor 11. The emitter of the transistor 10 is connected to the power supply source 2 via a low resistance series resistor 12 while its collector is connected to the power supply terminal VDD of the microprocessor 1. Decoupling is provided by means of a capacitor 13 connected between the collector of the transistor 10 and ground.

The above-described components constitute the basic structure of one embodiment of the circuit of the invention.

Its operation is now described.

The numerical values given by way of example in the present description apply to a circuit having components with the following values (which are naturally not be considered to be limiting):

| | |
|---|---|
| Resistor 8 = 1 MΩ | Resistor 11 = 22 kΩ |
| Resistor 12 = 10 Ω | Resistor 18 = 100 kΩ |
| Resistors 15, 15' = 100 kΩ | Capacitor 4 = 1 nF |
| Capacitor 7 = 10 nF | Capacitor 13 = 10 nF |
| Transistors 1, 2 = BC858 | NOR gate 9 = 4093 |
| Diodes 5, 16, 16', 17 = 1N4148 | |

And under the following operating conditions:
Vdd = 5.4 V; and
Vbf = 0 V to 5.4 V pulses at a recurrence frequency of 1 kHz, i.e. having a period T = 1 ms.

Immediately ahead of the rising edge of the first pulse, i.e. immediately before instant $t_0$ of the first transition, the voltage Vbf is zero, the transistor 6 is off, with its emitter voltage Ve being equal to the voltage across the terminals of capacitor 4, i.e. Vdd. Since the transistor is off, the collector voltage (control voltage Vc) is zero.

Immediately after the first transition occurring at instant $t_0$, Vbf = Vdd = 5.4 V, and as a result, by the well-known voltage-doubling effect, the emitter voltage Ve switches to $2 \times$ Vdd, with the diode 5 being reversed biased and the transistor 6 saturating.

The capacitor 8 then charges via the transistor 6 so long as it remains saturated, i.e. so long as Ve > Vdd, i.e. until the voltage across the terminals of the capacitor 4 becomes zero. During this very short time interval starting at $t_0$, the capacitor 7 is charged by a charge increment that produces a voltage increment ΔVc across its terminals. With the above-mentioned component values and operating conditions, ΔVc is about 0.47 V, and the above-mentioned time intervals is about 7.3 ns.

After this short charging period, and until the next pulse appears (i.e. the next rising edge at $t_1$), the transistor 6 remains off, so the capacitor 7 which is not isolated discharges through resistor 8.

Thus, after increasing by the voltage increment ΔVc, the control voltage Vc now decreases exponentially with a time constant given by the RC circuit constituted by components 7 and 8. With the component values specified, the control voltage Vc falls back from 0.47 V to 0.42 V after 1 ms.

When the next pulse appears, i.e. at $t_1 = t_0 = 1$ ms, the above-described cycle starts over, with the voltage across the terminals of the capacitor 7 again increasing by 1 voltage increment ΔVc (having the same value as it did during the preceding cycle). However, since the capacitor 7 has not discharged completely, the new charge is added to the remainder of the preceding charge, and the same applies to the voltages, such that the voltage reached at the end of the second pass is equal to Vc = 0.42 + 0.47 = 0.89 V. In contrast, the amount of which the capacitor 7 discharges during the following stage of the cycle will be greater, because of the exponential law, such that at $t_0 + 2$ ms, the voltage Vc will have fallen back to Vc = 0.8 V.

It can thus be seen that on each pulse the capacitor 7 is subjected to a charging cycle followed by a discharging cycle. So long as the recurrence frequency of the pulses is high enough (as is the case in the example given above), then the amount by which the capacitor discharges will always be less than the amount by which it charges, and as a result successive peak values of the control voltage Vc obtained after each pulse increase with increasing number of pulses, as can be seen very clearly in FIG. 2.

After some number of pulses (after the 16th pulse in the above example), the control voltage Vc exceeds the switchover threshold of the logic inverter gate, thereby causing its output Vs to switch from a high level to a low level, thereby changing the state of the transistor 10 which, now switched on, becomes saturated, thereby powering the microprocessor 1 by applying the voltage produced by the source 2 to the power supply input VDD of the microprocessor.

In the same manner, the transistor 10 may also power various other auxiliary stages of the card.

The low resistance series emitter resistor 12 serves to limit the current peak on switching the transistor 10. The resistor 11 is designed to apply sufficient base current to the transistor 10 to ensure that it is properly saturated.

It may be observed, by the way, that prior to allowing the microprocessor to perform digital processing, it is necessary to wait for its local oscillator to stabilize so as to bring the microprocessor effectively into operation and also to lock the power supply thereto. Since the stabilization time is of the order of a few milliseconds, a wake-up time of about 30 ms may be selected. The message transmitted by the on-board module on the vehicle should therefore allow for a latency time equal to said "wake-up" time between the end of the control pulses and the beginning of the ID information per se for processing by the microprocessor.

Various subsidiary and auxiliary circuits included in the circuit of the invention are now described.

In addition to the microprocessor being automatically woken up by detecting a specific pulse train at the output from the radio signal receiver, provision may also be made for forced waking up by pressing a pushbutton 14 or 14' used for controlling a particular function (e.g. switching on headlights remotely).

Pressure applied to one of these pushbuttons causes a respective input PA0 or PA1 of the microprocessor to be raised to the high state, with resistors 15 and 15' forcing a low logic level on these inputs so long as neither pushbutton 14 and 14' is depressed. In order to wake up the microprocessor when depressing one or other of these pushbuttons, a respective diode 16 and 16' is connected in series with each of them to apply the voltage Vdd to the inputs of the logic inverter gate 9, thereby changing the state of this gate while avoiding any disturbance to the operation of the frequency-voltage converter should it be in operation in the absence of any depression of the pushbuttons 14 and 14'.

Finally, means are provided for locking the power supply ON once the microprocessor has been woken up.

To this end, one of the outputs of the microprocessor, given reference PB0, passes to the high state as soon as the internal microprogram is put into operation. This high signal is applied to the inputs of logic inverter gate 9 via diode 17, thereby automatically locking the microprocessor power supply ON. The resistor 18 forces this link to a low level whenever the microprocessor is not powered.

Once digital processing has terminated, the microprocessor automatically switches itself OFF by switching this output PB0 to a low level. The capacitor 7 is then no longer connected to any voltage source and discharges quickly through resistor 8. As a result, if the low threshold of the gate 9 is 1.5 V, disconnection is obtained after about 12 ms.

I claim:

1. In a portable card including a microprocessor, RF receiving means for receiving a RF signal for waking-up said microprocessor, said signal being transmitted by an on-board electronic module of an automotive vehicle adapted to control given functions of said vehicle, RF transmitting means for transmitting to said electronic module an RF identification signal, and a low capacity battery for powering said portable card, a wake-up circuit for switching said microprocessor from a sleeping state to a woken-state, wherein said signal transmitted from said electronic module to said portable card comprises a given plural number of successive control pulses of given period, and wherein said circuit comprises:

converter means for outputting a variable electric signal, connected to said receiving means and including means for increasing the level of said variable electric signal, different from said pulses, by a predetermined value from a reference level each time a first pulse is received by said circuit from said receiving means, means for increasing the level of said variable electric signal by said predetermined value from its actual level each time a subsequent pulse is received by said circuit from said receiving means, and means for gradually decreasing the level of said variale electric signal between the reception of two subsequent pulses, and means for comparing the level of said variable electric signal with a predetermined threshold value and for producing a wake-up signal for said microprocessor only when said level has reached said threshold value, whereby said microprocessor is woken-up only when a given plural number of control pulses have been received and the frequency of said control pulses is not less than a predetermined frequency.

2. A circuit according to claim 1, wherein said variable signal is a voltage.

3. A circuit according to claim 1, wherein said predetermined value is independent from the pulse duration.

4. A circuit according to claim 1, wherein said predetermined value is independent from the pulse level.

5. A circuit according to claim 1, wherein said predetermined value is constant.

6. A circuit according to claim 2, wherein said converter means comprise:

a capacitor across which said variable signal is present, a two-state switch means, capable of being in a first state in which said capacitor is charged or in a second state in which said capacitor is not charged, a control means for said switching means, comprising a diode and capacitor circuit suitable for detecting a transition of each pulse and adapted to bring said switch means to its first state for a predetermined time interval so as to charge said capacitor and increase the voltage of said variable signal by said given amount, and a discharge resistor connected across the terminals of said capacitor across which said variable signal is present, so as to gradually discharge said capacitor and gradually decrease the voltage of said variable signal each time said switch means is in its second state.

7. A circuit according to claim 6, further including wake-up forcing means suitable for applying directly across said capacitor a voltage which is greater than said predetermined threshold value.

* * * * *